United States Patent
Potoroka, Sr.

(10) Patent No.: US 6,861,108 B1
(45) Date of Patent: Mar. 1, 2005

(54) METHOD, APPARATUS AND KIT FOR ATTACHING ARTIFICIAL FLOWERS TO NON-BLOOMING LIVE VEGETATION TO SIMULATE BLOOMING THEREOF

(76) Inventor: Walter Potoroka, Sr., 3505 Adams Rd., Oakland, MI (US) 48363-2811

( * ) Notice: Subject to any disclaimer, the term of this patent is extended or adjusted under 35 U.S.C. 154(b) by 376 days.

(21) Appl. No.: 09/706,316

(22) Filed: Nov. 4, 2000

Related U.S. Application Data

(60) Provisional application No. 60/164,741, filed on Nov. 12, 1999.

(51) Int. Cl.[7] ................................................ A41G 1/00
(52) U.S. Cl. .............................. 428/17; 428/22; 428/24; 428/27; 428/18; 428/99; 428/100; 206/423; 47/41.15
(58) Field of Search .............................. 428/17, 26, 24, 428/27, 905, 18, 22, 100, 99; 47/41.15; 206/423; D11/117

(56) References Cited

U.S. PATENT DOCUMENTS

| | | | |
|---|---|---|---|
| 2,514,177 A | 7/1950 | Brown, Jr. .................... 41/13 |
| 2,881,545 A | 4/1959 | Decamp ........................ 41/13 |
| 2,984,036 A | 5/1961 | Adler, Jr. ..................... 41/10 |
| 3,050,619 A | 8/1962 | Abramson .................... 240/10 |
| 3,041,766 A | 11/1962 | Decamp ........................ 41/13 |
| 3,137,610 A | 6/1964 | Flynn .......................... 161/30 |
| 3,309,258 A | 3/1967 | Gallo .......................... 161/26 |
| 3,452,476 A | 7/1969 | Kise ............................. 47/55 |
| 4,600,612 A | 7/1986 | Litwin ......................... 428/23 |
| 4,816,301 A | 3/1989 | Weitz .......................... 428/17 |
| 5,104,467 A | 4/1992 | Johnson ...................... 156/61 |
| 5,221,565 A | 6/1993 | Johnson ...................... 428/17 |
| 5,733,612 A | 3/1998 | Garry .......................... 428/23 |
| 5,776,561 A * | 7/1998 | Lindauer ..................... 428/24 |
| 5,836,017 A * | 11/1998 | Hironaga ........................ 2/69 |
| 5,839,718 A * | 11/1998 | Hase et al. .............. 252/301.4 |
| 6,017,596 A | 1/2000 | Deraney ...................... 428/27 |
| 6,058,648 A | 5/2000 | Kingston ..................... 47/41.5 |

\* cited by examiner

*Primary Examiner*—Deborah Jones
*Assistant Examiner*—Abraham Bahta

(57) ABSTRACT

Novel methods, apparatus and kits to provide a new presently-untapped market for state-of-the-art artificial flowers presently sold only as part of artificial plant assemblies that include artificial stems, branches, leaves, etc., the invention comprising various novel improved means, as well as kits including such means, for attaching such artificial flowers to non-blooming (pre-bloom, post-bloom or never-bloom) live vegetation having live stems, branches, leaves, etc., to simulate blooming thereof, for easy care-free instant yard beautification, said kits being devoid of artificial plant stems, branches, leaves, etc.

32 Claims, 3 Drawing Sheets

METHOD, APPARATUS AND KIT FOR ATTACHING ARTIFICIAL FLOWERS TO NON-BLOOMING LIVE VEGETATION TO SIMULATE BLOOMING THEREOF

CROSS-REFERENCE TO RELATED APPLICATIONS

Provisional patent application, Ser. No. 60/164,741, filed Nov. 12, 1999.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

This invention relates generally to gardening/landscaping and the like, and more particularly to methods, apparatus and kits for attaching artificial flowers to any pre-bloom, post-bloom or never-bloom live vegetation (growing plant life with live stems, branches and leaves) to resemble blooming live vegetation, such use of artificial flowers being already known in U.S. Patent prior art such as Brown, Jr. 2,514,177 (1950), Flynn 3,137,610 (1964) and Kingston 6,058,648 (2000).

The prior art also teaches patentability of non-relevant kits for use of artificial flowers, as in U.S. Patents to Garry 5,733,612 (1998), Litwin et al 4,600,612 (1986) and Deraney 6,017,596 (2000).

Kingston and Deraney refer to "the myriad of designs encompassed by the crowded prior art which have been developed for the fulfillment of countless objectives and requirements." (emphasis added), which attest to the worldwide extent of the flourishing live-looking artificial flowers/plant industry.

Other known U.S. Patent prior art, over which this invention is distinguished, is as follows:

A. E. Decamp U.S. Pat. No. 3,041,766 (1961)
Gallo U.S. Pat. No. 3,309,258 (1967)
Johnson U.S. Pat. No. 5,104,467 (1992)
Weitz U.S. Pat. No. 4,816,301 (1989)
Johnson U.S. Pat. No. 5,221,565 (1993)
A. Abramson U.S. Pat. No. 3,050,619 (1962)
Kise U.S. Pat. No. 3,452,476 (1969)
J. I. Adler, U.S. Pat. No. Jr. 2,984,036 (1962)
A. E. Decamp U.S. Pat. No. 2,881,545 (1959).

Since artificial-bloom vegetation is sold in the same stores as live-bloom vegetation, they obviously satisfy independent markets. However, it is also very important to note that artificial flowers are sold not separately, but as part of an artificial plant assembly, such as a vine or a plant main stem or trunk having leaves and flower stems attached thereto, there being no conversion kit available, for example.

The specific structures of artificial plants and flowers may vary, but a common feature (for purposes of manufacturing and assembly economy, even as between different plant assemblies, to simplify parts inventory and manufacture/assembly procedures) is a straight (free of sharp bends) and uniform-cross section plastic stem frictionally insertable through leaf and flower passages therefor.

BRIEF SUMMARY OF THE INVENTION

Almost every yard, whatever the size, has non-blooming live vegetation of some kind (wild bushes and vines, sturdy weeds, tree sprouts, pre-bloom or post-bloom plants, etc.) during some part of the growing season that could be quickly, easily and inexpensively beautified by attachment of artificial flowers thereto. It is believed that use of artificial flowers with live vegetation may actually enhance the real flower appearance of artificial flowers.

Some of the objectives and advantages of the invention are as follows:

(a) Experimentation has shown that the live look of non-blooming live vegetation (never-bloom, pre-bloom or post-bloom) can be used to support artificial flowers, and most strangers will believe such to be live flowers, even on close inspection thereof.

(b) Use as in (a) above on non-blooming live vegetation involves no initial cost, except for the artificial flowers, and minimal maintenance and care, or no care.

(c) Artificial blooms endure the entire growing season, or even year around, as desired, and bloom types and/or colors can be easily located and/or changed as desired.

(d) The invention contemplates no or minimal structure changes in prior art artificial flowers per se presently marketed as artificial plants, so that a new conversion market can be supplied with existing artificial flower structures.

(e) The invention contemplates a unique easy gardening landscaping method implemented by marketing (as in a kit) of artificial flowers devoid of artificial support therefor (main and flower stems, branches and/or leaves) for use with live non-blooming vegetation, to serve an additional market not presently served, for additional industry sales volume and savings to the consumer, who doesn't need or want the artificial support members, but needs additional flowers for larger live bushes, etc.

(f) Artificial flowers are advertised as "washable" and are easily applied to and removed from live vegetation, for storing, cleaning and/or change to different yard locations as yard live vegetation changes, and for year-to-year variety.

(g) Artificial flowers allow pre-bloom and post-bloom application to short-time blooming bushes (lilac, forsythia, etc.) and permits any desired bloom color, during the entire growing season.

(h) Yard color provided by artificial flowers does not require a true match of flowers to the live vegetation leaves. For example, an artificial tulip tree bloom can be applied to a lilac or forsythia live bush, especially for, but not limited to, more remote peripheral yard areas where such details cannot even be detected, the bloom presence and color being the important feature.

(i) With non-blooming live vegetation, instant yard color is provided and retained, in deep shade areas, without need for watering, fertilizing, use of pesticides, etc.

(j) Instead of frictionally/slidably receiving the free end of the plastic stem of an artificial plant assembly, the socket or passage in the base of the artificial flower can receive, or the flower base can be formed to include, as in an artificial flower kit, means such as a pin, clip or other adapter means, for fastening the prior art artificial flowers to live vegetation stems or branches of varying shape and size against loosening or dropping off caused by the elements, such as rain, wind, heat, etc., and any flower that does drop off can be simply replaced.

(k) The real-looking artificial flowers can be modified as follows for increased yard enjoyment, as around a deck, patio or other area:
(i) made of glow-in-the-dark material or
(ii) made to include a receptacle (see FIGS. 2, 2*a* and 2*b*) for liquid scents, liquid hummingbird food and/ or animal repellant.

(l) Another modification of the invention comprises elongated support means similar to a soft copper wire having slidably assembled thereon, or attached thereto, a plurality of individual artificial flowers that can be positioned wherever desired along the wire, so that artificial flowers can be repeatedly assembled on, and removed from, live vegetation in the manner of a string of lights on a Christmas tree, the diameter and color of the support means being such as to be substantially invisible on live vegetation with leaves, the flexibility of the support means being such as to permit twisting thereof around small live branches to retain the flowers thereon in any desired position, the support means being devoid of any artificial stems, branches or leaves.

(m) The invention is specially beneficial for gardeners who are seniors (a growing population segment and market) or handicapped who can add yard color without excessive exertion, etc.

BRIEF DESCRIPTION OF THE SEVERAL VIEWS OF THE DRAWINGS

In the drawings,

FIG. 6*b* illustrates the clip engaging a live vegetation branch when spreading of jaws 52 ceases.

DETAILED DESCRIPTION OF THE INVENTION

Figure 1:
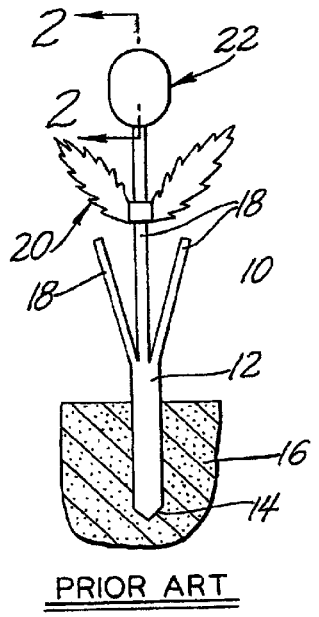
FIG. 1 is a schematic elevational view illustrating the elements of a typical prior art artificial blooming plant assembly.

FIG. 1 illustrates a typical prior art artificial simulated blooming plant 10 assembled (apparently by hand) from molded plastic and fabric parts including a main stem 12 having a pointed end 14 adapted to be inserted into the ground 16 and a plurality (only three are shown, but five or more are common) of integral flower and leaf stems 18 to each of which leaf members 20 and an artificial flower (silk, for example) 22 are attached.

Figure 2:
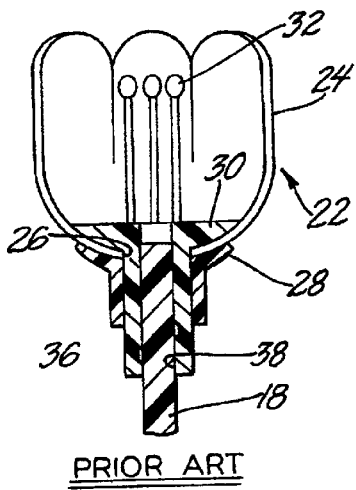
FIG. 2 is an enlarged fragmentary portion of FIG. 1, in cross-section on the plane of line 2—2 in the direction of the arrows.

FIG. 2 is an enlarged cross-sectional view of the artificial flower 22 and its attachment to an artificial flower stem 18 in a manner so that the assembled flower can be easily removed from and replaced on the stem 18 as a unit, conveniently without separation of the flower parts described below.

Typically, the flower 22 per se is assembled by placing the silk petal member 24 with the central opening 26 over the first tubular member 28 and then retaining the petal member in place by inserting the second tubular member 30 downwardly through the petal opening 26 and through the tubular member 28. The plant assembly is completed by inserting each artificial flower stem 18 through any desired number of leaf members 20 and finally through tubular member 30 of a flower 22.

Tubular member 30 may have other live flower details, such as the simulated stamen 32, to enhance a live look.

Figure 3:
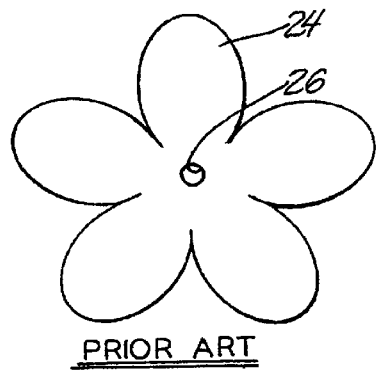
FIG. 3 is a plan view of the pre-assembly flower petal element of FIG. 2.
Figure 4:
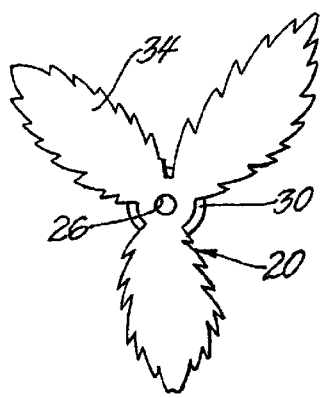
FIG. 4 is a plan view similar to FIG. 3 of the leaf portion of FIG. 1.

The leaf members 20 are designed, assembled and applied like the flowers 22, in that the FIG. 4 three-leaf silk cutout 34 (similar to the five-petal cutout 24 of FIG. 3) has a central opening 26 and is retained by tubular members similar to members 28 and 30 of FIG. 2, so that the flower stem 18 can be inserted through the member 30. However, details of the leaf members 20 are not important, since the invention contemplates no use of any artificial leaves that could differ from the live vegetation leaves.

Figure 2A:
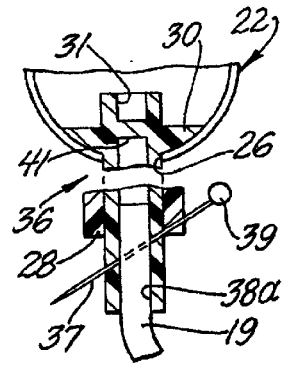
FIG. 2*a* is a view similar to that of FIG. 2 illustrating a flower receptacle.

It is important to note that the artificial flower stem 18 of FIG. 2 can, instead, in practice of the invention, be a same-size cut free end of a live vegetation stem or branch 19, as shown in FIG. 2*a*.

It has been discovered that the above prior art artificial flower structure conveniently enables practice of the invention with little or no structural changes, thus virtually eliminating concerns of redesign, manufacture, testing, cost studies and the many other questions normally involved in commercialzation of inventions.

Figure 2B:
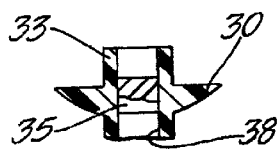
FIG. 2*b* is a fragmentary portion of FIG. 2*a* wherein the receptacle is a separate element.

In FIG. 2*a*, member 30 is formed with an integral cup-like receptacle 31 for materials such as scents, liquid hummingbird food, animal repellant, etc. In FIG. 2*b*, the cup-like receptacle 33 is formed by a separate member 35 frictionally retained in prior art passage 38. Receptacles 31 and 33 are more easily cleaned and refilled than a full-size hummingbird feeder, as recommended by bird experts to protect the birds against diseases caused by deteriorated food.

As seen in FIGS. 2, 2*a* and 5–7, tubular members 28 and 30 together provide a "base" 36 for the flower 22, as referred to above and in the claims, the passage 38 through member 30 being the referenced "passage or socket" receiving the stem 18 of plant 10. Obviously, the specific flower structure details can vary, but a main object of the invention is to provide a kit to facilitate use and increase sales of prior art artificial flowers that are already in production for use in artificial plants, whatever the flower design may be.

Obviously, a straight pin attaching means 37 (preferably one with a suitable head enlargement 39 and included in a kit) can be inserted loosely through the much larger through passage 38 and into the live stem or branch 46, but the push pin-type adapter 40 may be preferred not only for assembly convenience, but more importantly for stability of the flower attachment by body 42. Pin 37 may be inserted through the passage 60 of FIG. 6a or the passage 60a of FIG. 2c, where the diameter of live stem 19 is too small for frictional engagement. Also, pin 37 with safety head 39, may be merely manually forced through the artificial flower in any direction/position and into or through a live branch as shown in FIGS. 2a and 2d.

Figure 6A:
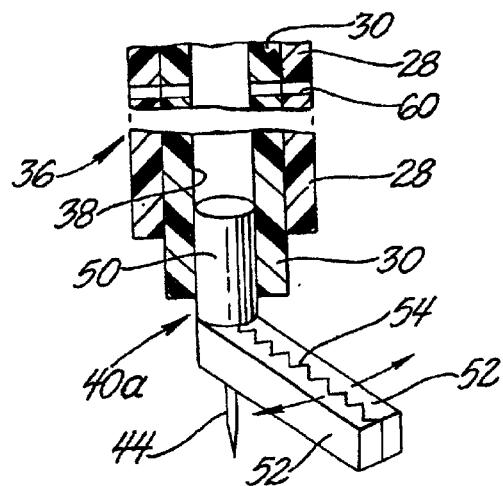
FIGS. 6*a* and 6*b* are enlarged fragmentary perspective views, partly in cross-section, of a separate clip adapter assembled in an artificial flower embodying the invention.
Figure 6B:
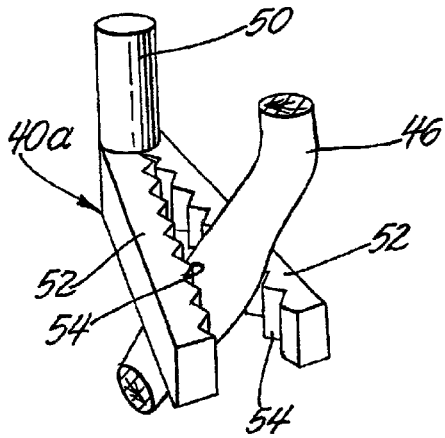

FIGS. 6a and 6b illustrate a separate clip-type adapter 40a, which may be a molded plastic part having a first portion 50 adapted to be frictionally inserted into passage 38 (or socket 38a) and a second portion comprising a pair of resilient jaws 52, preferably having teeth 54 or other gripping surface and adapted to be spread sufficiently to grip a live stem or branch 46 of substantially variable shape and size (unlike the uniform shape and size of the artificial stem or branches 18 for insertion into a same-size passage 38) to secure the artificial flower 22 thereon when the jaws are released.

Figure 8:
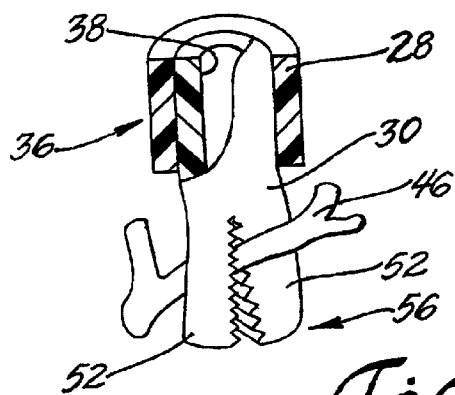

While the jaws 52 could be formed to extend axially from the first portion 50, as in FIG. 8, the non-parallel or angular relationship of portion 50 and the jaws 52 might provide a greater degree of best-positioning of the artificial flower 22 on the live vegetation 46, especially on lower-growing vertical live vegetation stems or branches that will be viewed from above.

Incidentally, combining artificial flowers with non-blooming live vegetation is not limited to outdoor gardening—it can be practiced with live house plants for similar reasons, to enhance the live look of artificial flowers, for a live flowering plant look, possibly with a scent, per FIG. 2a or 2b.

Although combining artificial flowers with live vegetation is known, the crowded art leaves room for improvement as to how it can best be accomplished, for which reference is made to FIGS. 5–8, 9 and 10 illustrating several novel prior art-compatible options, particularly adapted for, but not limited to, use of artificial flowers having a base with a passage to receive an artificial stem.

Figure 2C:
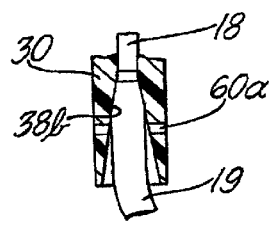
FIG. 2*c* is a fragmentary cross-sectional view taken on the plane of FIG. 2 illustrating tapered passage artificial flower attachment means.
Figure 2D:
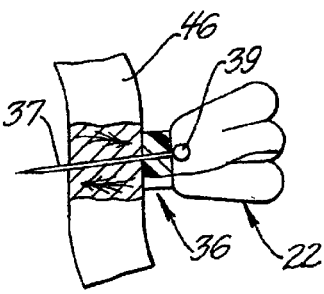
FIG. 2*d* is an elevational view, partly in cross section, illustrating a pin attachment means.
Figure 2E:
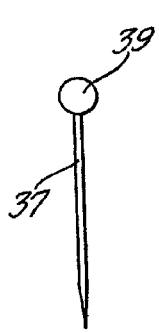
Figure 5:
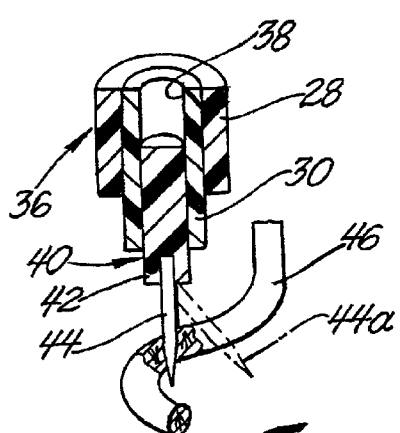
FIG. 5 is an enlarged fragmentary cross-sectional view of a separate pin adapter element assembled in an artificial flower embodying the invention.

In FIGS. 5, 6a and 6b, the flower through-passage 38, or the closed-end 41 (in some flowers) socket 38a in FIG. 2c are already available to frictionally receive either the free end of a live vegetation stem (19 in FIG. 2a) or a separate adapter attaching means (40 in FIG. 5 or 40a in FIGS. 6a and 6b) for connecting the artificial flower to a live vegetation stem or branch.

More specifically, adapter attaching means 40 in FIG. 5 comprises a plastic or other body 42 frictionally engaged in passage 38 or socket 38a (FIG. 2a) having a pin 44 extending therefrom (in the manner of a bulletin board push pin) for insertion into the live vegetation stem or branch 46 having a shape or size preventing frictional insertion thereof directly into passage 38 or socket 38a. Body 42 and pin 44 may be axially off-set, as shown at 44a.

Figure 7:
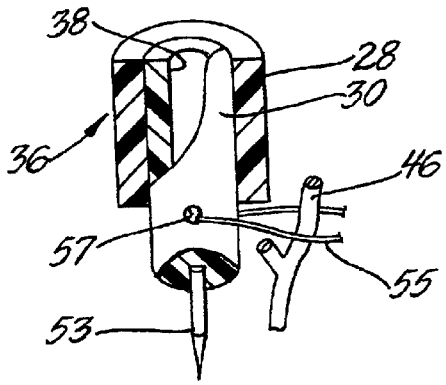
FIGS. 7 and 8 are views similar to FIGS. 5 and 6, but illustrating integral pin (FIG. 7) and clip (FIG. 8) means for attaching artificial flowers to live vegetation.

FIGS. 7 and 8 illustrate integral pin 53 and clip 56 means for attaching artificial flower 22 to live vegetation 46, as distinguished from the separate pin and clip means 40 and 40a, respectively, of FIG. 5 and FIGS. 6a and 6b. That is, in FIGS. 5 and 6, the attachment adapter means 40 and 40a are separate members received in passage 38 of the prior art tubular member 30, while in FIGS. 7 and 8, the pin 53 and clip 56 are formed as integral parts of tubular member 30 per se, a simple optional design change that can be included in any prior art artificial flower structure to eliminate separate adapter members 40 and 40a and make the flower attachment means self-sufficient. It is noted that the FIG. 8 structure permits the prior art assembly of artificial flowers by inserting tubular member 30 downwardly through tubular member 28.

Figure 9:
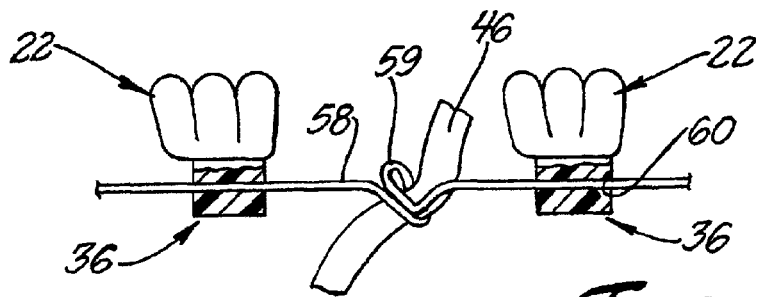
FIG. 9 is a schematic illustration of a modification of the invention wherein a plurality of artificial flowers 22 are supported on a wire-type support to be applied to live vegetation.
Figure 10:
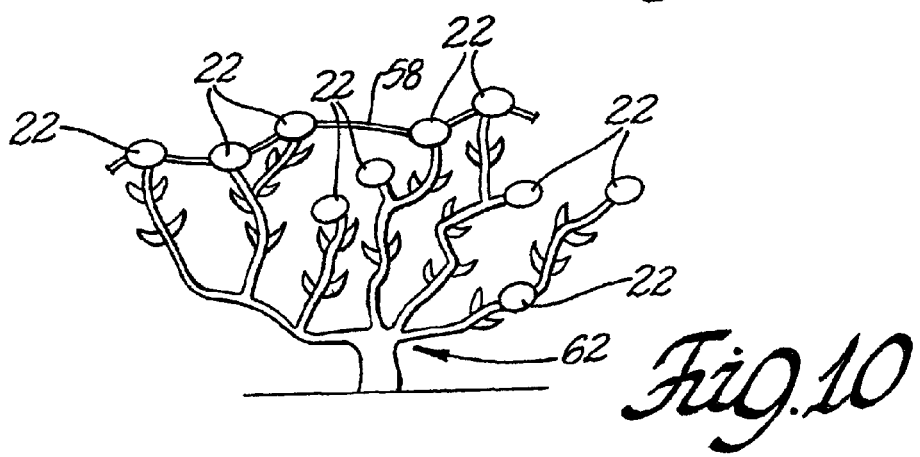
FIG. 10 is an elevational view of a live non-blooming vegetation bush,
some of the artificial flowers being separate as in FIG. 1 and others being connected by wire-type means as shown in FIG. 9.

Further, while pin and clip flower attaching means are described above, other convenient means are possible, such as the wire-type means of FIGS. 9 and 10, for example. Another means is the FIG. 7 well-known simple and very inexpensive twist tie 55, with or without the passage 57 formed through tubular member 30, to snugly attach an artificial flower of any design or structure to a live vegetation branch 46. Obviously, other acceptable means may be possible.

FIG. 9 illustrates schematically wire-type support of a plurality of artificial flowers 22 for application of the flowers, as on a live vegetation larger bush, generally in the manner of a string of Christmas tree lights. Here, again, it is preferable to minimize design changes to prior art artificial flowers. Thus, in FIG. 9, an elongated wire-like support 58, which can be made of any suitable material such as soft metal or plastics, etc., preferably wire that retains a shape to which it is bent, connects a plurality of artificial flowers 22 of any design or structure, frictionally and slidably along support 58, which extends through a passage 60 formed in each flower base 36 (the transverse passage 60 through the assembled tubular members 28 and 30 in FIG. 6a, for example), as shown schematically in FIG. 9, whatever the specific flower base 36 design may be. Alternatively, clip adapters, such as those already described above, or any other suitable attaching means may be employed to connect flowers 22 to support 58, which is very important for attaching flowers where desired on the live vegetation, unlike the fixed position of Christmas tree lights on the electrical cord. It is understood that base 36 of FIG. 9 can include any or all of the base structures of drawing FIGS. 2–8.

The important properties and function of the support 58 are described in Item (l) above—it must be capable of being twisted/wound around a small live branch (as at 59 of FIG. 9) to hold a flower location thereon, which is not possible with the relatively large and stiff electrical conductor wires of Christmas tree lights.

FIG. 10 illustrates live vegetation, such as a bush 62, to which some flowers 22 are applied/attached by an elongated wire-type support 58, other flowers 22 being attached individually, where desired or needed, for whatever reason, as by the above described separate or integral pin or clip adapters. The support 58, which is purposely made visible to illustrate the invention, would, of course, be hidden from view within a leafy live vegetation bush, just as the proposed pin, clip or other adapters would be.

It is important to note that the cross-referenced U.S. Provisional Patent Application included color photograph drawing Figures of non-blooming tree sprout, lilac, forsythia, lily, house plant and other unidentified live vegetation converted to very live-looking blooming vegetation in accordance with the invention, such photographs not being included in the drawings hereof, to avoid the added costs and possible other requirements/complications of U.S. and foreign applications.

One of such photographs vividly evidenced the unnecessary cost to a consumer to acquire artificial flowers 22 of FIG. 1 for attachment to non-blooming live vegetation by scavenging the same from artificial vegetation such as plant 10 and discarding the unwanted main stem 12, stems 18 and leaves 20, which comprise at least half of the artificial plant material. A kit comprising the invention solves the above problem.

The mere and obvious lack of a conversion kit, as proposed and claimed herein, strongly suggests patentability of an unfulfilled need, in view of recorded unpaid testimonials of amateur gardeners to whom the invention was explained in confidence after their amazement at the pleasing simulated blooming of private-yard experimental use of the invention, despite mismatch of the artificial flower and the live vegetation leaves.

It must be appreciated that, in order to illustrate details of the invention,

FIGS. 2, 5, 6, 7 and 8 are substantially enlarged, as compared to the roughly-measured dimensions of typical artificial flower molded plastic parts, which indicates the minute details of which state-of-the-art plastic molding or other processes are capable:

member 30—length ⅜", O. D. ⅛", I. D. 2/32"
member 28—length 3/16", O. D. 5/32", I. D. ⅛"
stamen 32—length>1", width<1/32"

FIG. 2c illustrates a tapered passage 38b to frictionally receive either a uniform-diameter artificial flower stem 18 of an artificial plant assembly 10 at the upper smaller passage diameter (or a same-diameter live stem or branch), or a range of larger-diameter live vegetation stems or branches 19 tightly wedged into the tapered passage 38b from the larger-diameter lower end thereof.

Figure 11:
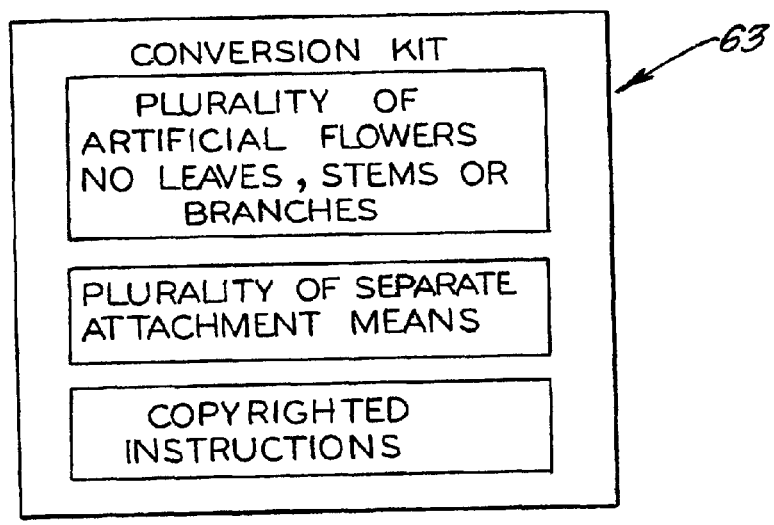
FIG. 11 is a diagramatic illustration of the contents of a conversion kit embodying the invention.

It is emphasized that the invention contemplates sale of artificial flowers alone (as in a kit, for example) without artificial stems, branches or leaves, but with one or more alternative (including or in addition to a flower base passage) integral and/or separate attaching means (such as a pin, clip, wire-type elongated support, twist tie, tapered passage or other suitable means) and copyrighted instructions for securing the artificial flower(s) to non-blooming live vegetation to simulate live blooming vegetation. FIG. 11 is a diagramatic illustration of the contents of a conversion kit comprising the invention, the attachment means of which may be a commercially available prior art straight pin or tie, for example.

In other words, while no single drawing figure illustrates all of the integral and/or separate attaching means illustrated in the drawings, it is intended and apparent that an artificial flower and/or a conversion kit can include any one or a combination of or all of such attaching means, or some other equivalent attaching means, along with copyrighted instructions for use thereof, to solve the following problems: The prior art drawing figures illustrate typical straight and uniform-diameter stems to be frictionally engaged in like-diameter passages in the flower base and leaf members. However, live vegetation plants, bushes, etc., have stems and branches of varying shapes and dimensions (too small or much too large) that cannot be frictionally engaged in, or even inserted into, the prior art flower passages—thus, the need for the various disclosed attaching means, as in a kit, each of which alone may be sufficient for most attaching situations, but all or some combination of which will most likely suffice.

A Conversion kits embodying the invention are intended to contain artificial flowers alone and novel or prior art attaching means that are or may be needed for conversion, and to not contain what is obviously not needed (artificial stems, branches, and leaves, etc.), all in a single complete handy do-it-yourself package. It is apparent that a new market can be easily and naturally developed by any and all artificial flower manufacturers, whatever their specific artificial flower structures might be, to the mutual benefit of manufacturers and consumers alike. However, a kit embodying the invention may simply comprise only a plurality of artificial flowers of any design or structure, without artificial stems, branches or leaves, to be attached in any way by the consumer, as by a tie or straight pin, and instructions for use of said kit.

It is apparent that as used herein and in the claims, the terms "artificial flower" and "artificial flowers" mean a flower or flowers alone, devoid of any other artificial plant parts such as vines, stems, branches, leaves, etc., obviously not needed for conversion of non-blooming live vegetation to simulated-blooming live vegetation.

Although the invention and certain embodiments thereof have been disclosed and described in such clear and concise terms as to enable persons skilled in the art to practice the same, including the methods, apparatus and kits for combining artificial flowers with non-blooming live vegetation, it is to be understood that other embodiments and modifications may be possible within the scope of the invention, and no limitations are intended, except as recited in the appended claims.

What I claim as my invention is:

1. A kit for converting non-blooming live vegetation having live stems, branches or leaves to simulate blooming of such live vegetation, said kit comprising a plurality of artificial flowers devoid of artificial stems or branches or leaves not needed for such conversion and a plurality of means different from each other for attachment of said flowers to the live vegetation, thereby improving conversion by providing a choice of one of said plurality of different attachment means in said kit for best attachment for each flower location on the live vegetation.

2. A kit according to claim 1, wherein one of said plurality of different attachment means is a pin adapted to be stuck into any stem or branch of the live vegetation.

3. A kit according to claim 2, wherein said pin is an integral part of the structure of said artificial flowers.

4. A kit according to claim 2, wherein said pin is an adapter attachable to said flower.

5. A kit according to claim 1, wherein one of said plurality of different attachment means is a clip adapted to grasp stems or branches of the live vegetation of varying shape or dimension in any direction including transversely thereof.

6. A kit according to claim 5, wherein said clip is normally closed so that it must be opened to receive and grasp a live stem or branch.

7. A kit according to claim 5, wherein said clip is an integral part of the structure of said artificial flowers.

8. A kit according to claim 5, wherein said clip is a adapter attachable to said flower.

9. A kit according to claim 1, wherein one of said attachment means is a tie.

10. A kit according to claim 1, wherein, as one of said attachment means, said flowers are formed with a passage adapted to frictionally receive a live vegetation stem or branch for attachment of said artificial flower thereon.

11. A kit according to claim 10, wherein said base passage is tapered from a smaller-diameter end adapted to frictionally engage either the same size artificial plant stem in assembly of an artificial flower plant or one stem of a range of larger-diameter live vegetation stems or branches wedged therein from the larger-diameter end for conversion.

12. A kit according to claim 1, wherein one of said attaching means is a separate straight pin having sufficient length and a head to enable simply manually pushing said pin by said head into and through each of said artificial flowers, at any place and in any direction therethrough, and into a stem or branch of the live vegetation.

13. A kit according to claim 1, said kit further comprising instructions for accomplishing such conversion.

14. A kit for conversion of non-blooming live vegetation to simulate blooming thereof by attachment thereto of artificial flowers similar or identical to those otherwise used to assemble artificial flower plants, said kit comprising a plurality of such flowers, not as an assembled artificial flower plant, but separately, a plurality of means different from one another for attaching said flowers to the live vegetation and/or instructions for such attachment, as by use of a commercially available twist tie, pin or clip not included in said kit.

15. A kit according to claim 14, wherein said means for attaching comprises any one or more of a pin, a clip, a tie, a tapered passage and/or a wire-type support.

16. A kit according to claim 14, wherein said means for attaching is an elongated wire-like support having said flowers attached thereto for application of said flowers to a live tree or bush in the manner of a string of Christmas tree lights.

17. A kit for attaching artificial flowers to non-blooming live vegetation stems to simulate blooming thereof, said kit comprising a plurality of artificial flowers formed with a passage to repeatedly frictionally receive either an artificial stem in assembly of an artificial flower plant or a live stem for such simulation, said kit and/or said flowers further comprising means other than or cooperating with said passage for attaching said flowers to live stems not frictionally receivable in said passage, said other means not preventing use of said passage to repeatedly frictionally receive either an artificial or a live stem.

18. A kit according to claim 14, said kit further comprising means either integral with or separate from said flower(s) for attachment thereof to a live vegetation stem not frictionally receivable in said passage.

19. A kit according to claim 14, wherein a portion of said means for attaching is frictionally receivable in said flower passage and another portion thereof is attachable to a live stem not frictionally receivable in said passage.

20. A kit for converting non-blooming live vegetation to simulate blooming thereof, said kit comprising a plurality of artificial flowers and a plurality of alternative means selectable for best attachment of said flowers to the live vegetation.

21. Apparatus for converting non-blooming live vegetation to simulate blooming thereof, said apparatus comprising an artificial flower formed with a passage adapted to frictionally receive either an artificial plant stem therein when assembling an artificial plant or a live vegetation stem or branch for such conversion, said flower including additional means, integral with or attachable thereto by insertion into said flower passage, for attaching said artificial flower to a live vegetation stem or branch of a shape or size not frictionally receivable in said flower passage.

22. Apparatus according to claim 21, wherein said additional attaching means is a pin to be stuck into the live vegetation stem or branch.

23. Apparatus according to claim 21, wherein said additional attaching means is a resilient clip for grasping the live vegetation stem or branch in any position thereon, including across the stem or branch.

24. Apparatus according to claim 21, wherein said additional attaching means is both a pin and a clip.

25. Apparatus according to claim 21, wherein said base passage is tapered so that live stems or branches of variable size may be wedged therein.

26. Apparatus according to claim 21, wherein said flower is formed with a non-porous cup-like integral or separately-attached receptacle for retaining a liquid enhancement such as a scent, liquid hummingbird food or pest deterrent.

27. Apparatus for converting a non-blooming live vegetation to simulate blooming thereof, said apparatus comprising an assembly of a plurality of artificial flowers without artificial stems or branches or leaves connected on an elongated wire-like support adapted to be applied, in Christmas tree light fashion, over live vegetation such as a bush or tree, each of said flowers being movable along said support to a desired flower position on the live vegetation.

28. Apparatus according to claim 21, wherein said additional attaching means is a tie.

29. Apparatus for attaching artificial flowers to non-blooming live vegetation to simulate blooming thereof, said apparatus comprising an elongated wire-like support having a plurality of artificial flowers attached thereto and being constructed and arranged so as to enable application thereof to the live vegetation in the manner of Christmas tree lights.

30. An artificial flower adapted to provide a hummingbird feeder, said flower having a non-porous receptacle for retaining liquid hummingbird food, said receptacle being either an integral part of said flower or removably attached thereto.

31. Means for attaching to live vegetation an artificial flower having a passage for frictionally receiving an artificial flower stem to assemble an artificial flower plant, said means having a portion frictionally and removably insertable in the flower passage and another portion for attachment to a stem or branch of the live vegetation not frictionally insertable in the flower passage.

32. A single-step method of marketing artificial flowers used in assembly of artificial flower plants, said step comprising marketing a plurality of said flowers separately from such artificial plaits, in a kit with a plurality of alternative means selectable for best attachment of said flowers to non-blooming live vegetation to simulate blooming thereof, one of said attaching means being a passage in said flowers for frictionally and removably receiving an artificial or live stem or one of said plurality of alternative attaching means.

* * * * *